UNITED STATES PATENT OFFICE.

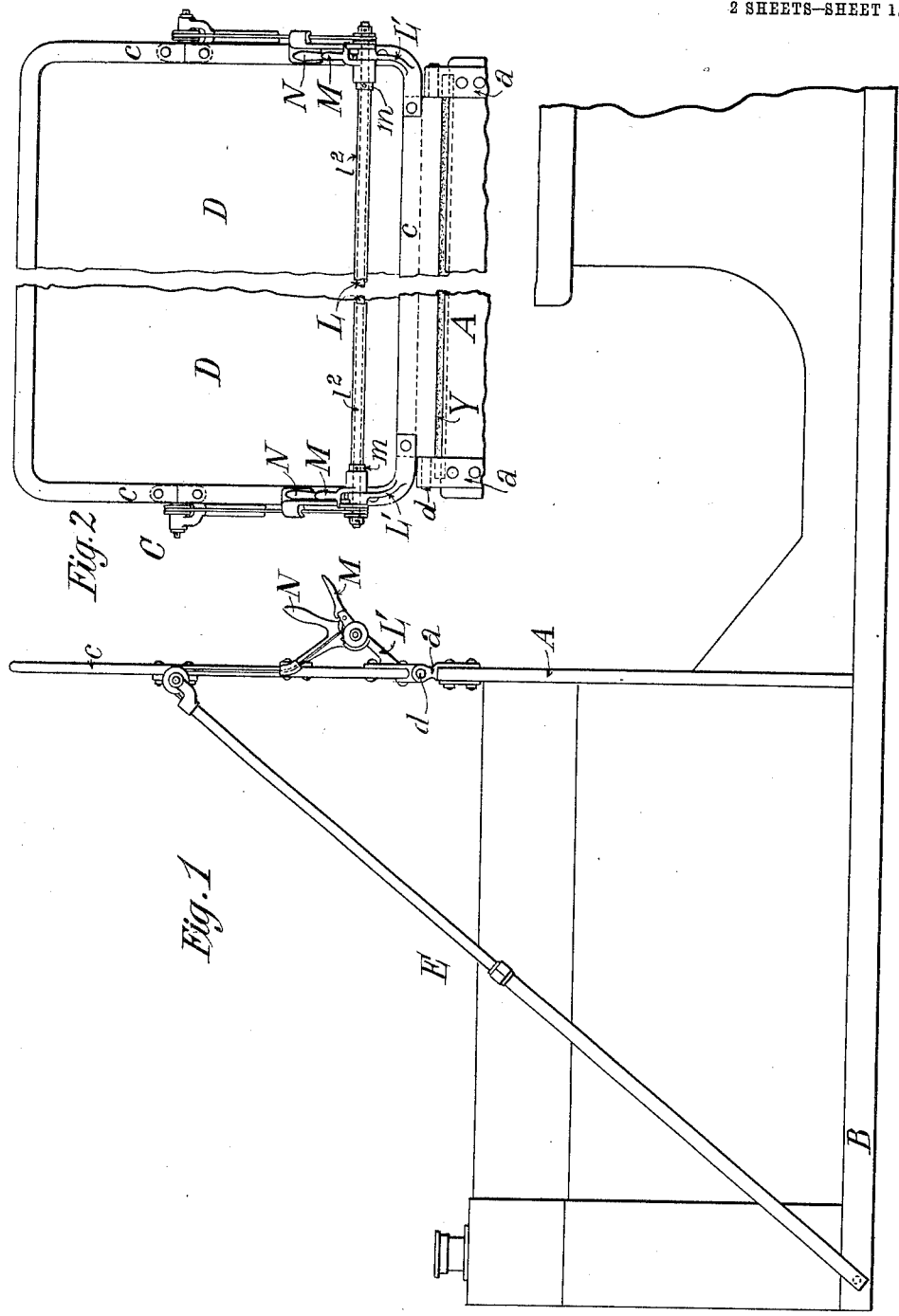

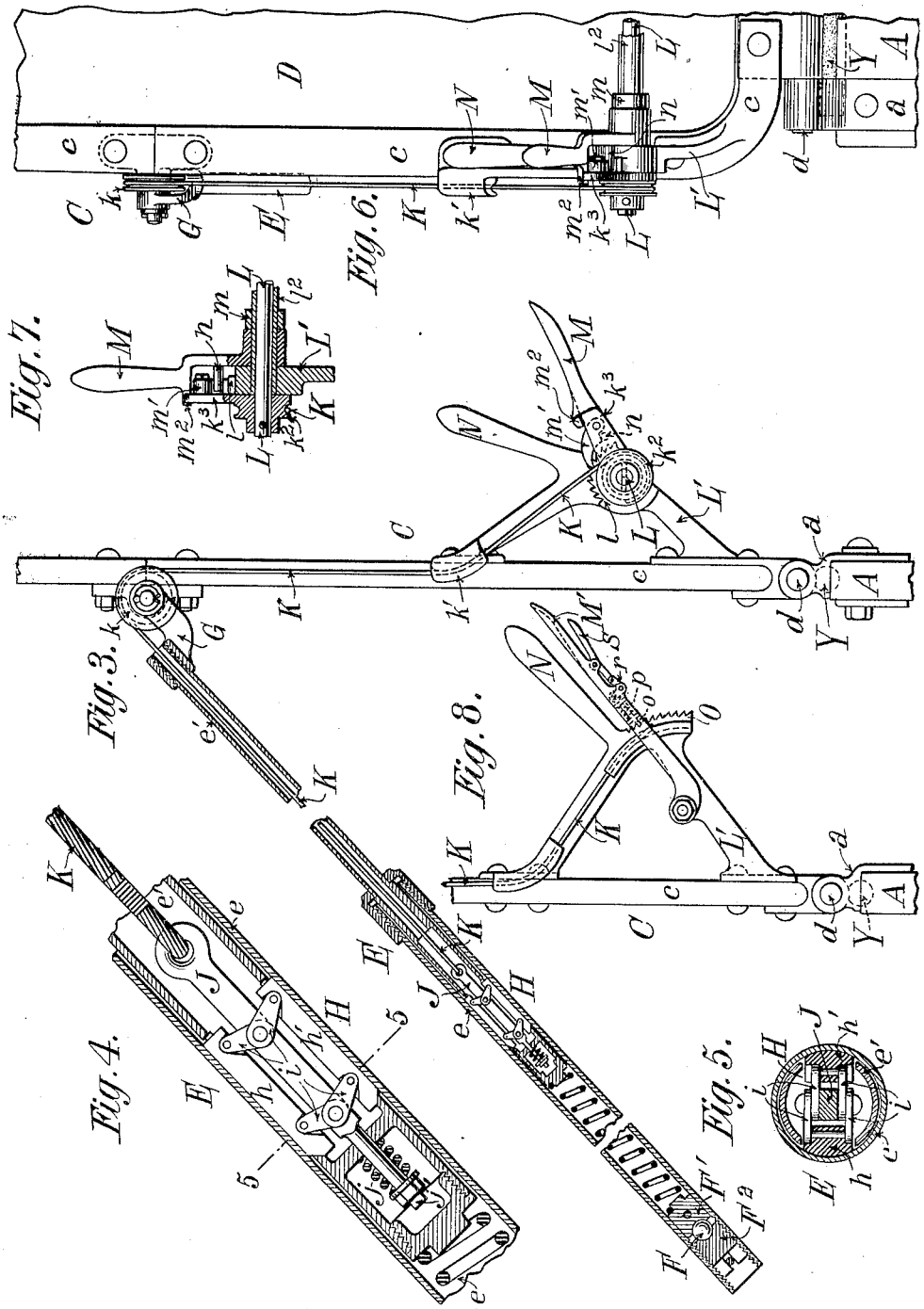

RAYMOND MUGNIER, OF NEW YORK, N. Y., ASSIGNOR TO OLIVER M. EDWARDS, OF SYRACUSE, NEW YORK.

WIND-SHIELD FOR VEHICLES.

1,097,603. Specification of Letters Patent. Patented May 19, 1914.

Application filed March 26, 1909. Serial No. 486,007.

*To all whom it may concern:*

Be it known that I, RAYMOND MUGNIER, a citizen of France, residing in the city of New York, borough of Bronx, and State of New York, have invented certain new and useful Improvements in Wind-Shields for Vehicles, of which the following is a full, clear, and exact description, reference being had to the drawings, accompanying and forming a part of the same.

My invention relates, generally to shields or guards, commonly known as "wind shields", which are more or less transparent and are arranged in front of the operator's or driver's seat of automobiles and other vehicles to more or less protect those riding therein from the effects of quickly passing through the air, against the wind or in storms and it relates more particularly to that class of wind shields having a movable portion or portions adapted to be moved more or less out of the protecting positions that such shields usually occupy in use.

The object of my invention is to provide simple, cheap and reliable means for securing the movable portion of the shield or guard in the desired position and releasing the same for moving such portion more or less out of one desired position to another.

The invention consists in the combinations of parts or devices hereinafter set forth and particularly pointed out in the claims hereunto annexed and forming a part of this specification.

Like letters of reference, wherever they occur, indicate corresponding parts in the several figures of the drawings.

Figure 1 illustrates in side elevation a portion of the body of an automobile having one embodiment of my invention combined therewith, the wind shield being shown in the protecting position; Fig. 2 shows the wind shield seen in Fig. 1 in rear elevation or as seen when one is seated in the automobile, such shield being partly broken away as shown; Fig. 3 illustrates partly in section and partly side elevation the construction seen in Figs. 1 and 2, portions being broken away in order to show the parts on an enlarged scale from what they are shown in Fig. 1; Fig. 4 illustrates in longitudinal section and on an enlarged scale the securing and releasing means seen in Fig. 3. Fig. 5 shows in cross section and partly in plan view such securing and releasing means as seen on line 5—5 of Fig. 4; Fig. 6 shows in rear elevation a portion of the shield seen in Fig. 1 and illustrates the portion so shown as seen from the driver's or operator's seat; Fig. 7 shows a detail of the operating means by which the securing and releasing means are operated, portions thereof being shown in section; Fig. 8 shows a modified form of operating means by which the securing and releasing means are operated for securing the movable portion of the shield in the desired position and releasing it when desired to move such portion into another position.

In Figs. 1 to 7, inclusive, A represents that portion of the automobile, car or carriage to which the wind shield therein shown is attached and B represents that portion of the car or carriage to which the means for holding or supporting the movable portion of the shield in position is attached.

C represents the movable portion of the shield, *c* the frame thereof which holds the glass D. Any desired form of means may be employed for connecting the movable part of the wind shield to the immovable part thereof or to the car or vehicle. As here shown the movable portion of the wind shield is connected to the car or vehicle by means of a pivotal connection formed by two members, one of which *a* is attached to the immovable portion A of the car and the other member *d* is attached to the lower portion of the frame *c* of the shield, as is more particularly seen in Figs. 2 and 6 of the drawings. In thus hinging or pivotally connecting the movable portion of the shield or guard to the car or carriage by the members *a*, *d*, it is desirable that means be employed for tightly and firmly holding such movable portion in relation to the members of the pivotal connection to the car or carriage. For this purpose I have shown a bar or rod Y of yielding or compressible material arranged between the immovable part of the car or carriage A and the hinge member *d* attached to the frame *c* of the movable portion of the shield C, such bar or rod Y being held in a semicircular recess or groove formed in the immovable part of the car or carriage A. This is no part of the present invention and does not need further explanation.

In a wind shield of the form herein described it is desirable that the movable part thereof be positively held in the desired position by means adapted to brace and hold such part against displacement. As herein shown I have illustrated braces or holding means formed in two parts, one part moving telescopically relatively to the other part in an endwise direction, there being preferably two of such braces or holding means, one arranged at one side of the car or carriage and the other at the opposite side thereof.

Any desired form of braces or holding means may be employed so long as such means are adapted to hold or brace the movable portion of the shield in the desired position and be moved to permit such portion to be moved from one desired position to another. The bracing or holding means are herein designated as E and are composed of two sections, $e$ and $e'$, the section $e'$ being preferably telescopically movable interiorly of the other section $e$, as more particularly seen in Fig. 3 of the drawings. The telescopic sections $e$ are preferably connected with the car or carriage by a form of universal joint composed as shown of a rounded head F working in semicircular recesses in blocks $F'$ $F^2$ secured in the lower parts of such sections. The heads F are attached to the part B of the car or carriage so that the telescopic sections $e$ may have a movement relatively to the car or carriage in different directions, there being one of these universal joint connections to the car for each bracing or holding means at the opposite sides of the car. The telescopic section $e'$ is pivotally connected to the movable portion of the shield between its upper and lower edges by a bracket G fixedly attached to such section so that movement between the movable part of the shield and telescopic section $e'$ may take place as such movable portion of the shield is moved from one desired position to another.

As herein shown the locking or clamping and releasing means are arranged interiorly of the telescopic sections $e$ and are connected with the telescopic sections $e'$ so as to move in an endwise direction therewith as the sections $e'$ move interiorly of the sections $e$. These clamping or locking and releasing means lock or engage one telescopic section with the other as a portion of such means is moved in one direction and as such portion moves in the opposite direction release their holding or locking action and permit the sections to telescopically move endwise of each other, to permit of moving the movable portion of the shield from one desired position to another. As shown these clamping and releasing means H consist of oppositely arranged clamping or locking parts $h$ $h'$, which are as shown movable to and from each other in suitable openings constructed in the lower portion of the telescopic section $e'$, so that their outer surfaces may be brought into frictional contact with the interior surface of the telescopic section $e$ of each of the bracing or holding means E. These clamping or locking parts $h$ $h'$ are preferably connected together and to an endwise movable bar J by links $i$, as more clearly seen in Fig. 4 of the drawings, thereby forming a sort of toggle joint between such clamping members $h$ $h'$. One end of the endwise movable bar J preferably passes through a partition formed in the telescopic section $e'$ into a chamber and is provided with a spiral spring $j$ and a nut $j'$ so that the tension of said spring always tends to move such bar J in a direction to cause the links $i$ connected with the bar to move the clamping or locking parts $h$ $h'$ nearer together, thereby releasing their holding action upon the interior surface of the section $e$ and permitting the two sections to move one relatively to another in an endwise direction. Upon the movement of such bar J in the opposite direction the spring $j$ is compressed and the links $i$ connected with such bar force the clamping or locking parts $h$ $h'$ away from each other and into clamping or locking position against the interior surface of the section $e$, thus holding the two sections in fixed relation to one another. This movement of this endwise movable bar J is caused to take place through a cord or bendable material K made of wire or other desirable material which is semi flexible or bendable. This cord, as K, is attached at one end to such bar J then passes up the interior of the section $e'$ and over a circular guide $k$, mounted on the pivotal connection of the telescopic section $e'$ to the movable portion of the shield, and thence down over a guide $k'$ and to a circular part $k^2$ to which its other end is fixedly attached, said circular part being remote from the circular guide $k$.

There are clamping or locking means and operating means arranged in each one of the telescopic braces at the opposite side edges of the wind shield of the character just described and the operating means are preferably connected together as hereafter described so that when the clamping or locking means in one telescopic brace or holding means is operated the other may be also simultaneously operated.

The circular part, as $k^2$ to which one end of the bendable cord or wire K is attached at each side edge of the wind shield is provided with an arm, as $k^3$. Each of these arms has a pawl $m'$ pivotally mounted thereon in position to engage with the teeth of a circular rack $l$ fixedly secured to the bracket L' mounted on the frame of the movable portion of the shield, as is more clearly seen in Figs. 6 and 7 of the drawings. These parts, as $k^2$, are fixedly attached to the opposite ends of a shaft L mounted to turn in a tube $l^2$, which is mounted to turn in the brackets L' attached to the movable portion of the shield. These parts, as $k^2$, are fixedly attached to the shaft outside of the brackets so that such shaft and tube are prevented from moving in an endwise direction. As shown the tube $l^2$ in which the shaft L turns has attached at each of its opposite ends a lever M which turns with such tube and is held against movement endwise of the tube by the brackets L' and collars $m$ secured to such tube, as is clearly seen in Figs. 2, 6 and 7. These levers M are each provided with a projection extending endwise of the tube on which the levers are mounted and arranged in position to engage with the respective arms, as $k^3$, on the circular parts, as $k^2$, and cause such arms and the parts, as $k^2$, to move in one direction and turn the shaft L in the tube by the engagement of the projections $m^2$ with such arms, as $k^3$, and permitting the pawls, as $m'$, as such levers M and shaft L turn, to drop into the teeth of the fixed racks, as $l$. Upon turning either of the levers, as M, in the direction to wind the bendable cords or wires, as K, upon the circular parts, as $k^2$, the endwise movable bars, as J, are caused to be moved in a direction for the links $i$ to force the clamping members as $h\ h'$, into engagement with the interior surface of the telescopic sections, as $e$, of the braces or holding means, as E, at each side edge of the wind shield. As the bendable cords or wires, as K, are wound upon the parts, as $k^2$, such cords or wires move in an endwise direction and the pawls, as $m'$, drop into the ratchet teeth of the fixed circular racks, as $l$, and prevent such cords or wires from unwinding from the parts, as $k^2$, and thereby hold the clamping and releasing means in locking engagement with the interior surfaces of the telescopic sections, as $e$, until the pawls are released from the ratchet teeth. When the pawls, as $m'$, are released from the ratchet teeth with which they engage, the springs, as $j$, cause the bars as J, and cords, as K, to move in an endwise direction and bring the clamping or locking parts, as $h\ h'$, nearer together and thereby release their holding action upon the telescopic sections, as $e$, when the movable portion of the shield may be moved from one position to another. The release of the pawls, as $m'$, from the ratchet teeth with which they engage is caused to take place by pins, as $n$, attached to the levers, as M, in position to engage with a cam surface on the under sides of each of said pawls, as is clearly indicated in Figs. 3, 6 and 7. These levers, as M, are free to move toward the wind shield without moving the arms, as $k^3$, of the circular parts, as $k^2$, and as such handles or levers move toward the shield, the pins, as $n$, engage with the cam surfaces on the under edges of the pawls, as $m'$, causing such pawls at their free ends to move out of engagement with the teeth of the circular racks, as $l$, and thereby release the pawls from the teeth of their respective racks. When these pawls are thus released the shaft L and the parts attached thereto are free to turn under the action of the tension of the springs, as $j$, and release the clamping or locking means to permit the movable portion of the shield to be moved from one desired position to another. As the levers, as M, are fixedly mounted upon the tube $l^2$, the movement of either lever causes the tube to turn in the brackets in which it is mounted and both pawls are released at the same time when such lever is moved toward the wind shield and when the lever is moved in the opposite direction the projections, as $m^2$, engage with the arms on the parts, as $k^2$, such parts and the shaft L are caused to correspondingly turn, the pawls being free to drop into the teeth of their respective racks. This construction permits either lever to be used to operate the clamping or locking means at both side edges of the wind shield whether such locking means are to be moved into locking position and held there or released from such position to permit the movable portion of the shield to be moved from one desired position to another.

When it is desired to change the position of the movable portion of the shield the operator or driver of the car or vehicle grasps either lever M, moves it toward the handle N fixedly attached to the movable portion of the wind shield, thereby releasing the pawls from their respective racks and at the same time releasing the clamping or locking parts, as $h\ h'$, from their locking or holding positions and taking hold of the handle N moves the movable portion from the position seen in the drawings into any desired position, when the lever, M, is moved away from the handle N winding the bendable cords or wires, as K, upon the circular parts, as $k^2$, thereby moving the clamping or locking parts, as $h\ h'$, into clamping or locking position, the pawls dropping into the teeth of their respective racks and thereby holding the locking parts into locking engagement with the telescopic sections, as $e$, until it is again desired to change the position of the movable part of the shield.

If desired other forms of operating means may be employed for bringing the clamping or locking parts, as $h\ h'$, into locking engagement with the parts for holding the movable portion of the shield in the desired position as, for instance, such as is shown in Fig. 8 of the drawings. In this embodiment of such means, the levers at the opposite side edges of the shield, if two complete sets of locking or clamping means are employed, are not connected together so that when one moves the other one necessarily moves correspondingly, as is the case in the preceding figures. If duplicate locking means are employed and the modified form of operating means be used that is shown in Fig. 8, then both levers have to be grasped and moved to operate their respective locking or holding means. All of the parts except the operating means in the construction illustrated in Fig. 8 may be the same as the parts shown in preceding figures.

In Fig. 8, the lever M' is pivotally connected to the bracket L' as shown and is provided with an endwise movable pawl o, adapted to engage with the teeth of a circular rack O fixedly attached to the bracket L'. This pawl o is movable toward the teeth on the rack O by a spiral spring p and is moved in the opposite direction by an elbow lever r pivotally mounted on the lever M' and connected with a second lever s, also fulcrumed upon said handle, all as is shown in Fig. 8. Upon the movement of the free end of the lever or handle s toward the lever M', the elbow lever R causes the pawl o to move endwise out of and away from the teeth on the rack O. Upon the release of the handle s (when lever M' is brought into the desired position) the spring p forces the pawl o into the teeth of the rack and the lever M' is held in fixed relation to the bracket L' and the handle N, until such lever is again grasped and the pawl o moved out of the teeth of the rack. To operate these operating means shown in Fig. 8, the driver or operator of the vehicle grasps the lever M' of each of said operating means and actuates the levers s thereby releasing the pawls o from the racks, then moving the levers M' toward handles N permits the springs j to release the locking means from holding engagement and then grasping the handles N moves the movable portion of the shield to the desired position. Then to lock such movable portion in position each lever M' is moved away from the handle N, until such locking or clamping means are brought into locking engagement with the bracing or holding means, when the pawls, as o, engage with the teeth of their respective racks and the movable portion of the shield is held in position until it is again desired to move it into another position, when the above operations are repeated.

What is herein shown and described will naturally suggest to those skilled in the art other specific forms, constructions and arrangements of parts than what is herein seen which, while varying in form or detail, will be combined together in substantially the manner herein set forth for accomplishing essentially the same work as is accomplished by the combinations herein described and because of this I do not desire to limit myself to the specific forms, constructions and arrangements of parts herein set forth, but desire to include all forms, constructions and arrangements which are within the spirit or principle of my invention.

What I claim as new is:—

1. In a wind shield for vehicles, the combination of a movable shield portion, bracing means comprising two members movable endwise relatively to each other during the adjustment of said shield portion, one of the members being connected to the shield portion and the other to the vehicle, locking means carried by the bracing members for holding the same in any adjusted position, and operating means for the locking means comprising a lever located at a point removed from the point of connection of one of the bracing members and the shield portion, and a cable connected at one end to the locking means and controlled by said lever, said cable extending lengthwise of the bracing members and around the point of connection of one of the bracing members and the movable shield portion, and into coöperative relation with said lever, substantially as and for the purpose described.

2. In a wind shield for vehicles, the combination of a movable shield portion, bracing means comprising two members movable endwise relatively to each other during the adjustment of said portion of the shield, one of the members being pivoted to said shield portion and the other being connected to the vehicle, locking means for holding the bracing members in any adjusted position, and operating means connected to the locking means and comprising a lever, and a cable connected at one end to the locking means and having its opposite end in coöperative relation to the lever, said cable extending in the direction of the axis of the bracing members and around the pivot connecting one of the bracing members and the shield portion and to the lever, substantially as and for the purpose specified.

3. In a wind shield for vehicles, the combination of a movable shield portion, bracing means comprising two members movable endwise relatively to each other during the adjustment of said shield portion, one of said members being connected to the movable portion of the shield and the other with the vehicle, locking means for holding the bracing members in any adjusted position, and operating means connected to the locking means comprising a lever carried by and movable with the shield portion and located at a point removed from the point of connection of one of the bracing members and the movable portion of the shield, and a cable in operative relation at one end to the lever and at its other end to the locking means, the cable extending around the point of connection of one of said members and the movable portion of the shield, substantially as and for the purpose set forth.

4. In a wind shield for vehicles, the combination of a movable shield portion, bracing means comprising two members movable endwise relatively to each other during the adjustment of said portion of the shield, one of said members being pivoted to said movable portion of the shield, and the other being connected to the vehicle, locking means for holding the bracing members in any adjusted position, and operating means connected to the locking means comprising a lever carried by the movable shield portion eccentric to the pivotal connection between one of said bracing members and the movable shield portion, and a cable connected at one end to the lever and at its other end to the locking means, the cable extending around the pivotal connection between one of the bracing members and the movable portion of the shield, substantially as and for the purpose described.

5. In a wind shield for vehicles, the combination of a movable shield portion, bracing means comprising two members movable endwise relatively to each other during the adjustment of said portion of the shield, one of said members being pivoted to said movable portion of the shield between the upper and lower edges of said portion, and the other member being connected to the vehicle, the movable shield portion being pivoted to the vehicle below the pivotal connection between one of the bracing members and said shield portion, locking means carried by said members for holding the same in any adjusted position, and operating means connected to the locking means comprising a lever carried by the movable shield portion below the pivotal connection between one of the bracing members and the movable shield portion, a cable connected at one end to the lever and at its other end to the locking means, and means located at the pivotal connection between the holding and bracing means and the movable portion of the shield for guiding the cable, substantially as and for the purpose specified.

6. In a wind shield for vehicles, the combination of a movable shield portion, bracing means comprising two members movable endwise relatively to each other during the adjustment of the shield portion, one of said members being connected to said movable shield portion and the other to the vehicle, locking means carried by said members for holding the same in any adjusted position, a spring tending to move the locking means out of operative position, and operating means connected to the locking means for moving the same against the action of the spring, comprising a part connected to the locking means, a lever for actuating said part, a pawl carried by said part and a rack with which said pawl coacts, the lever operating to release the pawl when moved in one direction for permitting the spring to unlock the locking means, and to actuate said part to tension the spring when moved in the opposite direction, substantially as and for the purpose set forth.

7. In a wind shield for vehicles, the combination of a movable shield portion, bracing means comprising two members movable endwise relatively to each other during the adjustment of the shield, one of said members being pivoted to the movable shield portion and the other to the vehicle, locking means carried by the bracing members for holding the same in any adjusted position, a spring tending to move the locking means out of operative position, and operating means connected to the locking means for moving the same against the action of the spring comprising a winding part carried by the shield portion at a point removed from the pivot connecting one of said members and the shield portion, a cable connected at one end to the winding part and at its other end to the locking means, the cable extending around the pivotal connection between one of the bracing members and the shield portion, a pawl movable with the winding part, a rack with which said pawl coacts, a lever movable about the axis of the winding part and having means for moving the pawl out of engagement with the rack when moved in one direction and for moving the winding part in the opposite direction, substantially as and for the purpose described.

8. In combination in a wind shield for vehicles, a pivotally supported part, an adjustable brace connected thereto, locking means associated with the brace, a bracket mounted on said part adjacent the pivot thereof, and provided with a hand-engaging portion, a lever mounted on said bracket and movable toward said hand-engaging portion, and a flexible connection controlled by said lever and connected to the locking means.

9. In a wind shield for vehicles, a shield section pivotally supported from the vehicle, an adjustable brace rod extending forwardly from said section to a part of the vehicle and connected to said section adjacent its end remote from its pivotal support, locking means for the brace rod carried thereby, a bracket rigidly secured to the shield section and extending rearwardly therefrom and provided with a hand-engaging portion, and operating means for the locking mechanism including a lever carried by said bracket and a yielding connection controlled by said lever and connected at one end to the locking means.

RAYMOND MUGNIER.

Witnesses:
C. D. MORRILL,
HENRY F. NEWBURY.

Copies of this patent may be obtained for five cents each, by addressing the "Commissioner of Patents, Washington, D. C."